United States Patent [19]
Westerink et al.

[11] Patent Number: 6,140,497
[45] Date of Patent: Oct. 31, 2000

[54] PROCESS FOR PREPARING A SPINNABLE, ISOTROPIC CELLULOSE SOLUTION

[75] Inventors: Jan Barend Westerink, Lochem; Marco Ypma, Duiven; Hendrik Maatman; Hanueke Boerstoel, both of Arnhem, all of Netherlands

[73] Assignee: Akzo Nobel N.V., Arnhem, Netherlands

[21] Appl. No.: 09/117,351

[22] PCT Filed: Jan. 31, 1997

[86] PCT No.: PCT/EP97/00460

§ 371 Date: Aug. 6, 1998

§ 102(e) Date: Aug. 6, 1998

[87] PCT Pub. No.: WO97/28298

PCT Pub. Date: Aug. 7, 1997

[30] Foreign Application Priority Data

Feb. 2, 1996 [NL] Netherlands .......................... 1002236

[51] Int. Cl.⁷ ...................................... C08B 5/00
[52] U.S. Cl. ............................. 536/62; 536/124
[58] Field of Search ....................... 536/62, 124

[56] References Cited

U.S. PATENT DOCUMENTS 4,196,282  4/1980  Franks et al. ............................. 536/56

FOREIGN PATENT DOCUMENTS

| | | |
|---|---|---|
| 71 44 34 | 11/1941 | Germany . |
| 054 859 | 6/1943 | Netherlands . |
| 1397456 | 5/1923 | U.S.S.R. . |
| 134 83 96 | 10/1987 | U.S.S.R. . |
| 139 74 56 | 5/1988 | U.S.S.R. . |
| 263810 | 12/1926 | United Kingdom . |
| WO 96/06208 | 2/1996 | WIPO . |
| WO 96/09356 | 3/1996 | WIPO . |

*Primary Examiner*—Howard C. Lee
*Assistant Examiner*—Everett White
*Attorney, Agent, or Firm*—Oliff & Berridge, PLC

[57] ABSTRACT

A spinnable, isotropic solution containing cellulose, phosphoric acid and/or anhydrides of phosphoric acid and water is prepared by dissolving cellulose in a solvent, the solvent being a homogeneous mixture of water and at least one of phosphoric acid and anhydrides of phosphoric acid such that the solvent contains 72–85 wt. % of phosphorous pentoxide, $P_2O_5$. The cellulose is mixed with the solvent in a mixing apparatus, the mixing apparatus having mixers, kneaders or the like, and capable of generating high shearing forces. The solution is converted from anisotropic phase to isotropic phase by the addition of water. The water required to convert the solution to the isotropic phase is added either just prior to, during or after the mixing step. The solvent preferably contains 72–80 wt. % $P_2O_5$ and 7–20 wt. % of cellulose, and is used to make hollow fibers, membranes, non-woven films, and other articles requiring the use of cellulose-containing solutions.

10 Claims, No Drawings

PROCESS FOR PREPARING A SPINNABLE, ISOTROPIC CELLULOSE SOLUTION

BACKGROUND OF THE INVENTION

1. Field of the Invention

The invention pertains to a process for preparing an isotropic, spinnable solution 94–100 wt. % of which is composed of the following constituents:

cellulose, phosphoric acid and/or its anhydrides, and water, by dissolving cellulose in a phosphoric acid-containing solvent.

2. Descriscption of Related Art

Such a process is known from GB patent publication 263 810, which describes the dissolution of linters cellulose in 85–90% $H_3PO_4$. The dissolution of cellulose can be facilitated by adding other reagents, such as glacial acetic acid and ethanol or homologues thereof. The overall time needed to obtain a homogeneous solution amounts to several hours. The solution can be used, e.g., for spinning artificial silk.

The process is also known from SU 1348396 and SU 1397456. In these publications various examples are provided of the dissolution of cellulose in 80–85% $H_3PO_4$. These publications show that the dissolving process takes up to several hours (or a multiple thereof) and that during the process there may be a substantial decrease of the degree of polymerization (DP) of the cellulose. The solutions can be used to make fibres or films.

SUMMARY OF THE INVENTION

Surprisingly, a simple process has now been found by means of which a homogeneous, spinnable, isotropic cellulose solution can be obtained. The invention consists in that a solution of cellulose is obtained by adding water before, during or after the dissolving of the cellulose in a 72–85 wt. % of $P_2O_5$ containing solvent, calculated on the overall quantity by weight of water, phosphoric acid, and the anhydrides thereof at the time before any extra water had been added.

A solution is considered to be isotropic when in a state of rest at room temperature it is not birefringent.

A spinnable solution is a solution which is suitable for being converted into fibres or filaments through extrusion, coagulation, and winding.

The term phosphoric acid in this patent application refers to all inorganic acids of phosphorus and their mixtures. Orthophosphoric acid is the acid of pentavalent phosphorus, i.e. $H_3PO_4$. Its anhydrous equivalent, i.e. the anhydride, is phosphorus pentoxide ($P_2O_5$). In addition to orthophosphoric acid and phosphorus pentoxide there is, depending on the quantity of water in the system, a series of acids of pentavalent phosphorus with a water-binding capacity in between those of phosphorus pentoxide and orthophosphoric acid, such as polyphosphoric acid ($H_6P_4O_{13}$, PPA).

The phosphorus content of the solvent is determined by converting the quantity by weight of phosphoric acid in the solvent into the equivalent quantity by weight of the accompanying anhydride and residual water. Thus converted, orthophosphoric acid is composed of 72.4 wt. % of phosphorus pentoxide and residual water, and $H_6P_4O_{13}$ is composed of 84 wt. % of phosphorus pentoxide and residual water.

The weight percentage of phosphorus pentoxide in the solvent is calculated by starting from the overall quantity by weight of phosphoric acid including its anhydrides and the total quantity of water in the solvent, converting the acids into phosphorus pentoxide and water, and calculating the percentage of said overall quantity by weight made up by phosphorus pentoxide.

In this description water derived from cellulose or from substances which are part of the other constituents and water which is added to obtain the solution are not included in the calculation of the concentration of phosphorus pentoxide in the solvent.

In order to effect more rapid dissolution of the cellulose, the solvent preferably contains 72–80 wt. % of phosphorus pentoxide.

The weight percentage of phosphorus pentoxide in the solution is calculated by starting from the overall quantity by weight of phosphoric acid including its anhydrides and the total quantity of water in the solution, converting the acids into phosphorus pentoxide and water, and calculating which percentage of said overall quantity by weight is made up by phosphorus pentoxide. For that reason in this description water derived from cellulose or from substances which are part of the other constituents and water which is added to obtain the solution are included in the calculation of the concentration of phosphorus pentoxide in the solution.

The weight percentage of cellulose in the solution is calculated by starting from the overall quantity by weight of all constituents in the solution.

Cellulose derivatized with phosphoric acid is included among the constituents making up 94–100 wt. % of the solution.

In the case of cellulose derivatized with phosphoric acid the percentages by weight of cellulose in the solution listed in this patent specification refer to quantities calculated back on the cellulose. This applies in analogous fashion to the quantities of phosphorus mentioned in this specification.

In addition to water, phosphoric acid and/or its anhydrides, and cellulose and/or reaction products of phosphoric acid and cellulose, other substances may be present in the solution.

The solution can be prepared by mixing constituents classifiable into four groups: cellulose, water, phosphoric acid including its anhydrides, and other constituents. The "other constituents" may be substances which benefit the processability of the cellulose solution, solvents other than phosphoric acid, or adjuvants (additives), for example, to counter cellulose decomposition as much as possible, or dyes and the like.

Preferably, the solution is composed of 96–100 wt. % of the constituents cellulose, phosphoric acid and/or its anhydrides, and water.

Preferably, no solvents other than phosphoric acid are employed, and adjuvants or additives are present only in amounts of 0 to 4 wt. %, calculated on the overall quantity by weight of the solution. More preferably still is a solution containing the lowest possible quantity of substances other than the constituents cellulose, phosphoric acid and/or its anhydrides, and water, i.e., with from 0 to 1 wt. % of additives.

DETAILED DESCRIPTION OF PREFERRED EMBODIMENTS

Spinnable, isotropic solutions according to the invention can be obtained when the solution contains less than 20 wt. % of cellulose. It was found that by using the process according to the invention spinnable, isotropic cellulose solutions can be obtained where there is a clear connection between the cellulose concentration in the solution and the weight percentage of phosphorus pentoxide in the solution.

For instance, it was found that a spinnable, isotropic solution having a cellulose concentration of 4.8 wt. % can be obtained when the solution contains 58–75 wt. % of phosphorus pentoxide. A spinnable, isotropic solution having a cellulose concentration of 7.6 wt. % can be obtained when the solution contains 59–71 wt. % of phosphorus pentoxide. A spinnable, isotropic solution having a cellulose concentration of 11.4 wt. % can be obtained when the solution contains 61–69 wt. % of phosphorus pentoxide. A spinnable, isotropic solution having a cellulose concentration of 17.1 wt. % can be obtained when the solution contains 63–65 wt. % of phosphorus pentoxide.

As described in non-prepublished patent application WO 96/06208 in the name of Applicant, anisotropy may be observed in solutions obtained by dissolving cellulose in a solvent containing 65–80 wt. % of phosphorus pentoxide.

It has now been found that the anisotropic character of a solution containing less than 20 wt. % of cellulose depends, among other things, on the concentration of phosphorus pentoxide in the solution.

Thus it was found that an anisotropic solution having a cellulose concentration of 7.6 wt. % can be obtained when the solution contains 71–75 wt. % of phosphorus pentoxide. An anisotropic solution having a cellulose concentration of 11.4 wt. % can be obtained when the solution contains 69–76 wt. % of phosphorus pentoxide. An anisotropic solution having a cellulose concentration of 17.1 wt. % can be obtained when the solution contains 65–79 wt. % of phosphorus pentoxide.

Spinnable, isotropic solutions according to the present invention can be obtained by adding cellulose to a solvent containing 68–85 wt. % of phosphorus pentoxide in an appropriate mixing and/or kneading apparatus. In a preferred embodiment of the process according to the present invention, extra water is added to the solvent or the mixture formed by the cellulose and the solvent before, during or after the combination of the cellulose with the solvent. The extra water can be added in combination with other components, e.g., as water present in an other solvent, for example, by the addition of extra phosphoric acid.

It was found that prior to the addition of cellulose and/or other components such as extra water, the solvent should be a homogeneous mixture of phosphoric acid and any other components which are present in the solvent. Such homogeneous mixture can be obtained, e.g., by mixing all components of the solvent at elevated temperature and keeping the solvent heated for some time. Isotropic spinnable solutions having a cellulose concentration of 7 to 20 wt. % can only be obtained if extra water is added to the solvent or the mixture formed by the cellulose and the solvent just before, during or after the combination of the cellulose with the solvent.

It was further found that isotropic spinnable solutions having a cellulose concentration of 7 to 20 wt. % according to the present invention can be obtained from anisotropic cellulose solutions in the manner described in non-prepublished patent application WO 96/06208 in the name of Applicant, by reducing the phosphorus pentoxide content in the solution, e.g., by adding water to the anisotropic solutions.

As was described in non-prepublished patent application WO 96/06208, the dissolution of cellulose in a solvent containing mainly phosphoric acid is hindered/slowed down by the formation of an impermeable coating on the outside of the cellulose. In WO 96/06208 various ways of solving this problem are mentioned, such as rapidly and thoroughly mixing the cellulose and the solvent or the use of powdered cellulose or small cellulose chips.

It was found that this problem occurs not only in the preparation of anisotropic cellulose solutions (which have a comparatively high cellulose concentration in the solution), but also in the preparation of isotropic cellulose solutions. The potential answers to this problem put forward in WO 96/06208 were found to be suitable for use also when preparing isotropic solutions.

Preferably, the cellulose and the phosphoric acid-containing solvent are combined in an apparatus in which there can be intensive mixing in of one or more added constituents as a result of the shearing forces generated by mixing and kneading members in the apparatus, e.g., in a high-shear mixer. Examples of high-shear mixers such as are known to the skilled person include a Linden-Z kneader, an IKA-duplex kneader, a Conterna kneader or a twin-screw extruder.

After the phosphoric acid-containing solvent and the cellulose have been combined in a mixing and kneading apparatus, the cellulose and the solvent are mixed and the cellulose dissolves. The degree of mixing should be such as will not slow the cellulose dissolution down too much through the formation of an impermeable coating on the outside of the cellulose. The dissolution of the cellulose can be slowed down by lowering the temperature. In one preferred process according to the invention, the cellulose and the solvent are combined in the apparatus, with the temperature in the section of the apparatus where the combination of the cellulose and the solvent takes place being less than 45° C., preferably in the range of 5 to 20° C. In another preferred embodiment the solvent prior to being combined with the cellulose is cooled such that the temperature is less than 25° C. The cooling preferably takes place in such a way, e.g., by means of chilling, that there is no crystallization of the solvent. Alternatively, solvent crystallization can be prevented by rapid combination of the cellulose and the solvent.

In a preferred process according to the invention the construction of the apparatus is such that during the mixing and kneading the starting products and the formed solution are carried from a passage in the apparatus where the solvent and the cellulose are combined to a passage where the solution leaves the apparatus. Examples of such apparatus include a LIST-mixer, a twin-screw extruder, an IKA-Z kneader, and a Conterna kneader.

In such an apparatus different zones can be distinguished in the direction in which the products present in the apparatus are conveyed. Mixing of the supplied cellulose with the solvent and diminution will take place chiefly in the first zone. In a following zone the dissolution of the cellulose will play a major part as well. A subsequent zone will mostly hold the prepared solution, which will be further homogenized and mixed with the not yet dissolved cellulose. If so desired, the solution can also be degassed.

In such an apparatus the cellulose dissolution and the properties of the prepared solution can be influenced by the temperature selected for the different zones.

By selecting a temperature in the first zone of less than 30° C., preferably in the range of 5 to 20° C., the dissolution of the cellulose can be slowed down. By increasing the temperature, for example, in a subsequent zone, the cellulose dissolution is accelerated. It should be noted here that the dissolution of the cellulose and the combination of the solvent and the cellulose may be attended with the release of heat.

The DP of the cellulose solution can be controlled by selecting the temperature and the residence time in the zone of the mixing and kneading apparatus where chiefly cellulose in solution is present. As a general rule, the higher the temperature and the longer the residence time at this temperature are, the more the DP of the cellulose will be reduced. Furthermore, the DP of the starting material may have an effect on the DP reduction at a particular temperature and residence time.

Since the heat transfer between the products in the apparatus and the apparatus itself usually does not proceed in an ideal manner, differences in temperature can arise between the products in the apparatus and the apparatus itself.

The apparatus can also have a zone where the prepared solution is degassed, for example, by being passed through a zone, of reduced pressure. In this zone or in a separate zone, water or other constituents can be extracted from the prepared solution or added to it.

The prepared solution can be filtered in the apparatus or on leaving it to remove any minute undissolved particles from the solution.

The obtained solution is highly viscous. It can be used directly, but can also be stored for some time at low temperature, for example, between −20 and 10° C. As a general rule, the longer the storage time desired for the solution, the lower the preferred temperature selected will be.

It should be noted that the obtained solution may solidify, e.g., by crystallizing, if it is stored at a lower temperature for some time. Heating the formed solidified mass will again give a highly viscous solution.

By means of the above-described preparative process cellulose solutions with a controlled reduction of the cellulose DP can be made in a short period of time. For instance, it was found that a cellulose solution can be made from cellulose chips and a solvent containing phosphoric acid within 15 minutes and even in less time still. This period can be reduced further yet by selecting a higher temperature at which to prepare the solution.

For the preparation of the solution according to the invention use may be made of every available type of cellulose, for example, Arbocell BER 600/30, Arbocell L 600/30, Buckeye V5, Buckeye V60, Buckeye V65, Viscokraft, and Eucalyptus cellulose, all types known to the skilled person. Cellulose can be supplied in a wide range of forms, including sheets, strips, scraps, chips or powder. The form in which the cellulose can be supplied is restricted by its introduction into the mixing and kneading apparatus. When the cellulose used is in such a form that it cannot be introduced into the apparatus, it has to be made smaller outside the apparatus in a known manner, for example, with the aid of a hammer mill or a shredder.

When a mixture of different phosphoric acids is employed to obtain a solvent having the desired quantity of acid converted into anhydride, it is preferred to heat the acids after they have been mixed to a temperature in the range of 30 to 80° C. and to keep the solvent heated for ½–12 hours. In some cases other times and/or temperatures are desired, depending on the acids employed. For instance, a very homogeneous solution without irregularities is obtainable if use is made of a solvent obtained by heating orthophosphoric acid at a temperature in the range of about 40 to 60° C., adding the desired quantity of polyphosphoric acid to it, and then mixing the whole and cooling it down to about 20° C.

According to one preferred method, the solvent is left to stand for some time, say, from 30 minutes to several hours, at a temperature between 30 and 70° C., prior to being combined with the cellulose.

According to another highly preferred method, there is intensive stirring to do away with any local variations in low and high acid concentrations, and cellulose is added, optionally in the presence of small quantities of adjuvants or other constituents. As was described above, before, during or after the cellulose addition also extra water can be added to the solvent or the prepared mixture of cellulose and solvent.

Preferably, the solvent does not crystallize during the preparation.

In addition to water, phosphoric acid and/or its anhydrides, and cellulose and/or reaction products of phosphoric acid and cellulose, other constituents may be present in the solution.

These constituents may be added to the solvent prior to its combination with the cellulose. Alternatively, the other constituents may be added to the cellulose prior to its combination with the solvent. Furthermore, the other constituents may be added when the solvent and the cellulose are combined. And, of course, it is possible to add the other constituents after the solvent and the cellulose have been combined.

It was found that when the process according to the invention is employed, the solution contains at least 0.02 wt. % of phosphorus bound to the cellulose.

It was also found that by adding a small quantity of water to the solvent immediately before, simultaneous with, or shortly after the addition of the cellulose, a solution with a low content of cellulose-bound phosphorus is obtainable.

The temperature at which the solution is prepared and stored was found to affect the content of cellulose-bound phosphorus. As a general rule, a higher temperature during the preparation and/or storage will give a higher content of cellulose-bound phosphorus.

It was further found that the concentration of phosphorus pentoxide in the solvent has an effect on the content of cellulose-bound phosphorus. As a general rule, a higher concentration of phosphorus pentoxide in the solvent will give a higher content of cellulose-bound phosphorus.

The cellulose to be used preferably has an α-content of more than 90%, more particularly of more than 95%. For spinning good fibres from the solutions it is recommended to use so-called dissolving pulp with a high α-content, for example, such as is generally employed in the manufacture of fibres for industrial and textile applications. Examples of suitable types of cellulose include Alphacell C-100, Arbocell BER 600/30, Buckeye V65 , Buckeye V5, Buckeye Cotton Linters, and Viscokraft. As determined by the procedure disclosed hereinafter in this patent specification, the cellulose DP advantageously is in the range of 250 to 6000, preferably in the range of 500 to 5000. As a general rule, the spinnability of the solution is improved as cellulose with a higher DP is used in the preparation of the solution.

As is well-known to the skilled person, there will be a DP reduction during the dissolution of the cellulose. In consequence, the cellulose DP in the solution will be lower than the DP of the starting product.

Cellulose in the commercially available form generally contains some water, for example, about 5 wt. % water, and can be used as such without any objection. Of course, it is also possible to use dried cellulose, but this is not essential.

The invention further pertains to isotropic, spinnable, cellulose solutions, which can be obtained in a particularly advantageous manner using the above-described process. This holds especially for isotropic, spinnable solutions having a cellulose concentration in the range of 5 to 20 wt. %, more preferably in the range 10 to 20 wt. % and an phosphorus pentoxide content in the range of 60 to 71 wt. %, more preferably 63 to 71 wt. %, and for isotropic solutions having a cellulose concentration of less than 8 wt. % and a phosphorus pentoxide content in the range of 60 to 80 wt. %, more preferably 71 to 80 wt. %.

The isotropic cellulose solution can be put to various uses. For instance, the solution can be used in the manufacture of hollow fibres, membranes, non-wovens, films, and for other known applications of cellulose-containing solutions. In addition, the solution can be used to make cellulose derivatives.

Determination of isotropy/anisotropy

Visual determination of the isotropy or anisotropy was performed with the aid of a polarization microscope (Leitz Orthoplan-Pol (100×)). To this end about 100 mg of the solution to be defined were arranged between two slides and placed on a Mettler FP 82 hot-stage plate, after which the heating was switched on and the specimen heated at a rate of about 5° C./min. In the transition from anisotropic to isotropic, i.e., from coloured (birefringent) to black, the temperature is read off at virtual black. The transition temperature is indicated as $T_{ni}$.

The visual assessment during the phase transition was compared with an intensity measurement using a photosensitive cell mounted on the microscope. For this intensity measurement a specimen of 10–30 μm was arranged on a slide such that no colours were visible when crossed polarisers were employed. Heating was carried out as described above. The photosensitive cell, connected to a recorder, was used to write the intensity as a function of time. Above a certain temperature (differing for the different solutions) there was a linear decrease of the intensity. Extrapolation of this line to an intensity of 0 gave the $T_{ni}$. In all cases, the value found proved a good match for the value found by the above-mentioned method.

The solutions according to the invention are isotropic at room temperature. This means that $T_{ni}$ will be less than 25° C. However, there is a possibility that the solutions will not display any isotropy/anisotropy transition.

Determination of DP

The degree of polymerization (DP) of the cellulose was determined with the aid of an Ubbelohde type 1 (k=0.01). To this end the cellulose specimens to be measured were dried in vacuo for 16 hours at 50° C. after neutralisation, or the amount of water in the copper II ethylene diamine/water mixture was corrected to take into account the water in the cellulose. In this way an 0.3 wt. % of cellulose-containing solution was made using a copper II ethylene diamine/water mixture (1/1).

On the resulting solution the viscosity ratio (visc. rat. or $\eta_{rel}$) was determined, and from this the limiting viscosity ($\eta$) was determined in accordance with the formula:

$$[\eta] = \frac{visc.rat - 1}{c + (k \times c \times (visc.rat. - 1))} \times 100$$

wherein c=cellulose concentration of the solution (g/dl) and k=constant=0.25

From this formula the degree of polymerization DP was determined as follows:

$$DP = \frac{[\eta]}{0.42} \text{ (for } [\eta] < 450 \text{ml/g)},$$

or $$DP^{0.76} = \frac{[\eta]}{2.29} \text{ (for } [\eta] > 450 \text{ml/g)}$$

Determining the DP of the cellulose in the solution prepared as described above after the following treatment:

20 g of the solution were charged to a Waring Blender (1 liter), 400 ml of water were added, and the whole was then mixed at the highest setting for 10 minutes. The resulting mixture was transferred to a sieve and washed thoroughly with water. Finally, there was neutralization with a 2%-$NaHCO_3$ solution for several minutes and after-washing with water to a pH of about 7. The DP of the resulting product was determined as described above, starting from the preparation of the copper II ethylene diamine/water/cellulose solution.

Determination of phosphorus content

The quantity of phosphorus bound to the cellulose in the solution, or in a cellulose product made using said solution, can be determined by 300 mg of cellulose solution, which solution has been coagulated and, after thorough washing for 16 hours at 50° C., dried in vacuo and then stored in a sealed sampling vessel, being combined in a decomposition flask with 5 ml of concentrated sulphuric acid and 0.5 ml of an Yttrium solution containing 1000 mg/l of Yttrium. The cellulose is carbonized with heating. After carbonization hydrogen peroxide is added to the mixture in portions of 2 ml, until a clear solution is obtained. After cooling the solution is made up with water to a volume of 50 ml. ICP-ES (Inductive Coupled Plasma—Emission Spectrometry) is used to measure, by means of a phosphorus calibration line determined using reference samples containing 100, 40, 20, and 0 mg/l of phosphorus, respectively, the phosphorus content in the solution to be measured with the aid of the following equation:

phosphorus content (%)=$(P_{conc}$(mg/l)*50)/$(C_w$(mg)*10)

wherein: $P_{conc}$=the phosphorus concentration in the solution to be measured and $C_w$=the weighed out quantity of coagulated and washed cellulose.

Yttrium is added as internal standard to correct the solutions' viscosity variations. The phosphorus content is measured at a wavelength of 213.6 nm, the internal standard is measured at a wavelength of 224.6 nm.

The invention will be elucidated with reference to the examples below.

Unless specified otherwise, the following starting materials with accompanying specifications were used to make the solutions in the examples.

| Material | Manufacturer and product code | $P_2O_5$ content [%] |
|---|---|---|
| $P_2O_5$ | J. T. Baker, 0193 | 98 |
| $H_3PO_4$ | La Fonte Electrique SA, Bex Suisse crystallised, >99% (98.8% anal.) | 71.2 |
| $H_4P_2O_7$ | Fluke Chemika, 83210, 97%, (98.8% anal.) | 78.8 |

-continued

| Material | Manufacturer and product code | $P_2O_5$ content [%] |
|---|---|---|
| PPA* | Merck, 85% min. | 84 |
| $H_2O$ | demineralized | — |

*PPA = polyphosphoric acid

EXAMPLES

Example 1

15.4 g of Buckeye Cotton Linters (DP=5900) were dissolved at 20° C. in a solvent containing phosphorus pentoxide. This solvent was obtained by mixing and kneading 238.3 g of ortho-phosphoric acid and 54.7 g of polyphosphoric acid for 30 minutes at 50° C. 10 minutes after the addition of the cellulose with mixing at 20° C. a viscous isotropic solution was obtained which contained undissolved particles still discernible by microscope. After 72 minutes of mixing at 20° C. a homogeneous, spinnable, isotropic solution was obtained. The DP of the cellulose in solution was 850.

In this way an isotropic, spinnable solution containing 73.4 wt. % of phosphorus pentoxide and 4.7 wt. % of cellulose was obtained, starting from a solvent containing 73.6 wt. % of phosphorus pentoxide.

Example 2

13.1 g of powdered cellulose (DP=2300) were dissolved at 20° C. in a solvent containing phosphorus pentoxide. This solvent was obtained by mixing and kneading 199.2 g of ortho-phosphoric acid and 48.8 g of polyphosphoric acid for 40 minutes at 50° C. 27 minutes after the addition of cellulose with mixing at 20° C. a viscous isotropic solution was obtained which contained undissolved particles still discernible by microscope. After 67 minutes of mixing at 20° C. a homogeneous, spinnable, isotropic solution was obtained.

In this manner an isotropic, spinnable solution containing 73.5 wt. % of phosphorus pentoxide and 4.8 wt. % of cellulose was obtained, starting from a solvent containing 73.7 wt. % of phosphorus pentoxide.

Example 3

In a kneader a solvent was prepared at 45° C. by mixing and kneading 199.8 g of ortho-phosphoric acid and 54.8 g of polyphosphoric acid for 30 minutes. 60.7 g of the solvent was taken from the kneader for other experiments and the remainder cooled to 18° C. To this were added 32.8 g of water and, after 1 minute of kneading and mixing, 49.8 g of powdered cellulose (DP=700).

After 60 minutes mixing and kneading at 18° C., the cellulose had dissolved completely and a homogeneous, spinnable, isotropic solution was obtained.

In this manner an isotropic, spinnable solution containing 62.6 wt. % of phosphorus pentoxide and 17.1 wt. % of cellulose was obtained, starting from a solvent containing 74.0 wt. % of phosphorus pentoxide.

Example 4

In a kneader a solvent was prepared at 50° C. by mixing and kneading 122.7 g of ortho-phosphoric acid and 34.0 g of polyphosphoric acid for 45 minutes. The solvent was cooled to 18° C. To it were added 31.0 g of water and, after 1 minute of kneading and mixing, 25.6 g of powdered cellulose (DP=700).

After 78 minutes mixing and kneading at 18° C., the cellulose had dissolved almost completely and a spinnable, isotropic solution was obtained.

In this manner an isotropic, spinnable solution containing 61.4 wt. % of phosphorus pentoxide and 11.4 wt. % of cellulose was obtained, starting from a solvent containing 74.0 wt. % of phosphorus pentoxide.

Example 5

To the contents of a Linden kneader, 70.4 parts by weight of polyphosphoric acid (84 wt. % of phosphorus pentoxide), there were added at 18° C. 17.6 parts by weight of water and 12 parts by weight of powdered cellulose (DP=700). The contents of the kneader were vigorously mixed and kneaded at 18° C. After 30 minutes a homogeneous, spinnable, isotropic cellulose solution was obtained.

In this manner an isotropic, spinnable solution containing 66.7 wt. % of phosphorus pentoxide and 11.4 wt. % of cellulose was obtained, starting from a solvent containing 84.0 wt. % of phosphorus pentoxide.

Example 6

In a kneader a solvent was prepared at 45° C. by mixing and kneading 72.2 g of ortho-phosphoric acid and 16.6 g polyphosphoric acid for 45 minutes. Then the solvent was cooled to 10° C. To this were added 16 g of cellulose powder (DP=700). After 10 minutes kneading and mixing at 20° C. the cellulose was dissolved completely. To this homogeneous solution 293.4 g of $H_3PO_4$ (80%) were added.

After mixing during several hours a homogeneous, spinnable, isotropic cellulose solution was obtained containing 61.7 wt. % of phosphorus pentoxide and 3.8 wt. % of cellulose, starting from a solvent containing 74,5 wt. % of phosphorus pentoxide.

Example 7

In a kneader a solvent was prepared at 45° C. by mixing and kneading 78.3 parts by weight of ortho-phosphoric acid and 21.7 parts by weight of polyphosphoric acid for 45 minutes. From this solvent 235.1 g were transferred to a kneader and cooled to 3° C. To this were added 62.1 g of cellulose powder (DP=700). 7 minutes later the cellulose were completely and homogeneously dissolved. The temperature were 16° C. Under constant kneading and mixing at 20° C. to this were added during 25 minutes 48 g water.

A homogeneous, spinnable, isotropic cellulose solution was obtained containing 60.8 wt. % of phosphorus pentoxide and 17.1 wt. % of cellulose, starting from a solvent containing 74.0 wt. % of phosphorus pentoxide.

Example 8

A solvent was prepared by mixing and heating orthophosphoric acid and polyphosphoric acid in such a ratio that a solvent with a concentration of 74.5 wt. % $P_2O_5$ was obtained. 60.6 g of powdered cellulose (DP=700), which contained 4 wt. % equilibrium moisture, was added to 276 g of the solvent in an IKA-Duplex kneader. The components were kneaded at a temperature below 20° C. and a homogeneous, shiny, fiber-formimg solution was obtained. To this solution water was added stepwise until a isotropic spinnable solution was obtained, which contained 15.1 wt.

% cellulose and 63.4 wt. % $P_2O_5$. The solution had a clearing temperature ($T_{ni}$) of 10° C.

Example 9

In a Linden-Z kneader with extruder discharge a solvent was prepared at 50° C. by mixing and kneading 14890 g of ortho-phosphoric acid and 4110 g of polyphosphoric acid for 45 minutes. The solvent was cooled to 12° C. To it were added 1650 cellulose (Alphacell-C-100, DP=2300). Kneading was continued for 60 minutes, the last 50 of them with degassing. During the kneading of the solution the temperature was kept at 20° C.

In this manner an isotropic, spinnable solution containing 73.8 wt. % of phosphorus pentoxide and 7.6 wt. % of cellulose was obtained, starting from a solvent containing 74.1 wt. % of phosphorus pentoxide.

This solution was extruded at 40° C. through a spinneret having 375 capillaries each with a diameter of 65 μm. The extruded solution was passed through an air gap and coagulated in a bath filled with acetone of about 35° C. After coagulation the multifilament yarn formed was washed with water and neutralised with a 2.5 wt. % $Na_2CO_3.10H_2O$ solution in water. The yarn was then dried under very low tension.

Several experiments were carried out with different draw ratios in the air gap, the draw ratio being defined as the throughput rate in the coagulation bath divided by the rate at which the solution was extruded from the capillaries.

The mechanical properties of the resulting yarns were measured. The data is listed in Table 1.

TABLE 1

|    | DR  | Lin. den. [dtex] | BT [mN/tex] | EaB [%] | IM [N/tex] | FM [N/tex] | BTo [J/g] |
|----|-----|------------------|-------------|---------|------------|------------|-----------|
| 9a | 0.6 | 3320             | 180         | 17.4    | 3.5        | 1.6        | 18.6      |
| 9b | 0.9 | 2390             | 270         | 11.5    | 5.7        | 3.0        | 17.0      |
| 9c | 1.1 | 1770             | 310         | 9.5     | 7.6        | 4.2        | 16.1      |
| 9d | 1.5 | 1370             | 380         | 8.4     | 9.2        | 6.0        | 16.6      | wherein DR=draw ratio, BT=Breaking tenacity, EaB= Elongation at break, IM=Initial modulus, FM=Final modulus, and Bto=Breaking toughness.

Comparative example

In a kneader a solvent was prepared at 45° C. by mixing and kneading for 60 minutes 84 parts by weight of polyphosphoric acid (84 wt. % of phosphorus pentoxide) and 16 parts by weight of water. The obtained homogeneous solution was cooled to 18° C. and 9 parts by weight of powdered cellulose were added. The contents of the kneader were mixed and kneaded at for 60 minutes. Even after 60 minutes a mixing and kneading action it was not possible to obtain a homogeneous, spinnable, isotropic cellulose solution. The obtained mixture was of low viscosity with many undissolved cellulose parts. This comparative example shows that it is not possible to obtain an isotropic, spinnable cellulose solution containing 70.2 wt. % of phosphorus pentoxide and 7.8 wt. % of cellulose, starting from a solvent containing 70.5 wt. % of phosphorus pentoxide without the addition of extra water.

What is claimed is:

1. An isotropic, spinnable cellulose solution comprising 10–20 wt. % cellulose and 60–71 wt. % $P_2O_5$.

2. A process for preparing an isotropic, spinnable solution containing 7 to 20 wt. % of cellulose, 94–100 wt. % of said solution being composed of cellulose, water and phosphoric acid and/or its anhydrides, said process comprising the following steps:

starting from a solvent comprising a homogeneous mixture of water and at least one of phosphoric acid and anhydrides of phosphoric acid, wherein the solvent contains 72–85 wt. % of $P_2O_5$;

mixing the cellulose with said solvent in a mixing apparatus, the mixing apparatus having at least one of mixers and kneaders; and for converting the spinnable solution from the anisotropic to the isotropic phase, adding water to the solution just prior to, during or after the mixing step.

3. The process of claim 2, wherein the mixing apparatus generates high shearing forces.

4. The process of claim 2, wherein the solvent contains 72–80 wt. % $P_2O_5$.

5. A process for preparing an isotropic, spinnable solution, 94–100 wt. % of which is composed of cellulose, water and at least one of phosphoric acid and anhydrides of phosphoric acid, said process comprising:

adding cellulose to a solvent comprising a homogeneous mixture of water and at least one of phosphoric acid and anhydrides of phosphoric acid to form a composition containing at least 7 wt. % cellulose, said solvent containing 72–85 wt. % of $P_2O_5$;

mixing said composition in a mixing apparatus having at least one of mixers and kneaders to dissolve the cellulose; and if necessary to convert the spinnable solution from the anisotropic to the isotropic phase, adding water to the cellulose composition just prior to, during or after the mixing step.

6. The process of claim 5, wherein, in said adding step, greater than 7 wt. % cellulose is added.

7. The process according to claim 5, wherein water is added to the cellulose composition just prior to, during or after the mixing step.

8. The process according to claim 5, wherein the mixing apparatus generates high shearing forces.

9. The process according to claim 5, wherein said solvent contains 72–80 wt. % $P_2O_5$.

10. The process according to claim 5, wherein the isotropic, spinnable solution formed in the process contains 7–20 wt. % cellulose.

* * * * *

UNITED STATES PATENT AND TRADEMARK OFFICE
CERTIFICATE OF CORRECTION

PATENT NO.   : 6,140,497
DATED        : October 31, 2000
INVENTOR(S)  : Jan Barend Westerink; Marco Ypma; Hendrik Maatman; and Hanneke Boerstoel It is certified that error appears in the above-identified patent and that said Letters Patent is hereby corrected as shown below:

Please amend the above-identified patent as follows:

Title page, Item [75],
Line 3, change "Hanueke" to --Hanneke--.

Column 2,
Line 32, after "acid" insert --,--.

Column 10,
Line 38, change "74,5", to --74.5--.

Column 11,
Line 23, change "$Na_2CO_3.10H_2O$" to --$Na_2CO_3 \cdot 10H_2O$--.

Signed and Sealed this

Nineteenth Day of June, 2001

*Attest:*

*Attesting Officer*

NICHOLAS P. GODICI
*Acting Director of the United States Patent and Trademark Office*